United States Patent
Bishop, Jr. et al.

(10) Patent No.: US 7,313,688 B2
(45) Date of Patent: Dec. 25, 2007

(54) METHOD AND APPARATUS FOR PRIVATE MESSAGING AMONG USERS SUPPORTED BY INDEPENDENT AND INTEROPERATING COURIERS

(76) Inventors: James William Bishop, Jr., 3876 Clovergate Dr., Colorado Springs, CO (US) 80920; Richard Mo, 8430 Terrapin Trail, Colorado Springs, CO (US) 80919

(*) Notice: Subject to any disclaimer, the term of this patent is extended or adjusted under 35 U.S.C. 154(b) by 492 days.

(21) Appl. No.: 10/709,952

(22) Filed: Jun. 8, 2004

(65) Prior Publication Data
US 2005/0044412 A1    Feb. 24, 2005

Related U.S. Application Data

(63) Continuation-in-part of application No. 10/701,355, filed on Nov. 4, 2003.

(60) Provisional application No. 60/477,736, filed on Jun. 11, 2003.

(51) Int. Cl.
*H04K 1/00* (2006.01)
*H04L 9/00* (2006.01)
*G06F 15/16* (2006.01)

(52) U.S. Cl. .................... 713/153; 705/37
(58) Field of Classification Search ............. 713/153
See application file for complete search history.

(56) References Cited

U.S. PATENT DOCUMENTS

| | | | |
|---|---|---|---|
| 5,794,207 A * | 8/1998 | Walker et al. .......... 705/1 |
| 5,826,244 A * | 10/1998 | Huberman ............ 705/37 |
| 6,230,146 B1 * | 5/2001 | Alaia et al. ............ 705/37 |
| 6,360,221 B1 | 3/2002 | Gough et al. |
| 6,405,319 B1 * | 6/2002 | Arnold et al. .......... 726/3 |
| 6,529,885 B1 * | 3/2003 | Johnson ............... 705/64 |
| 6,636,965 B1 | 10/2003 | Beyda et al. |
| 6,834,341 B1 * | 12/2004 | Bahl et al. ............ 713/156 |
| 6,873,977 B1 * | 3/2005 | Aggarwal et al. ...... 705/64 |
| 7,010,697 B2 * | 3/2006 | Byrne et al. .......... 713/193 |
| 2002/0152383 A1 * | 10/2002 | Walsh et al. .......... 713/176 |
| 2003/0084347 A1 | 5/2003 | Luzzatto |

FOREIGN PATENT DOCUMENTS

WO    WO 03/005636 A1    1/2003

OTHER PUBLICATIONS

Stephen T. Kent, Internet Privacy Enhanced Mail, Communications of the ACM, Aug. 1993/vol. 36, No. 8, pp. 48-60.
Bob Serenelli and Tim Leisher, Securing Electronic Mail Systems, Military Communications Conference, 1992, MILCOM 1992 Conference Record, Communications—Fusing Command, Control and intelligence, IEEE, 11-14, Oct. 1992, pp. 667-680.
Kontzer, "Spammers Would Be Made to Pay Under IBM Research Proposal". InternetWeek.com, Mar. 20, 2003. URL: http://www.internetweek.com/story/showArticle.jhtml?articleID=7900141.

(Continued)

Primary Examiner—Matthew Heneghan

(57) ABSTRACT

A private messaging system including multiple interoperating, yet potentially competing, trusted couriers. A method and apparatus are provided for the purpose of distributing a trusted courier such that foreground and background messages are handled independently by separate components.

2 Claims, 15 Drawing Sheets

OTHER PUBLICATIONS

Dawson, et al. "Internet Calendaring and Scheduling Core Object Specification (iCalendar)". Memo—Network Working Group, Request for Comments: 2445, Category: Standards Track. Nov. 1998, pp. 1-148. The Internet Society.

Silverberg, et al. "iCalendar Transport—Independent Interoperability Protocol (iTIP) Scheduling Events, BusyTime, To-dos and Journal Entries". Memo —Network Working Group, Request for Comments: 2446, Category: Standards Track. Nov. 1998, pp. 1-109. The Internet Society.

Brody, "Making Spam Expensive". Technology Review, Apr. 2003, p. 28.

* cited by examiner

METHOD AND APPARATUS FOR PRIVATE MESSAGING AMONG USERS SUPPORTED BY INDEPENDENT AND INTEROPERATING COURIERS

RELATED APPLICATIONS

This application claims the benefit of U.S. Provisional Patent application 60/477,736 filed on Jun. 11, 2003 and is a continuation-in-part of U.S. Ser. No. 10/701,355 filed on Nov. 4, 2003, which claims the benefit of U.S. provisional applications 60/423,705 filed on Nov. 4, 2002, 60/436,227 filed on Dec. 23, 2002 and 60/466,910 filed on May 1, 2003 all of the disclosures of which are incorporated herein by reference.

TECHNICAL FIELD

This invention pertains in general to electronic messaging such as electronic mail ('email') and similar communication, and in particular to providing message privacy services.

BACKGROUND OF THE INVENTION

U.S. Provisional Patent Application 60/466,910 entitled SYSTEM, METHOD, AND APPARATUS FOR SIMPLIFIED PRIVATE MESSAGING by the present inventors, (hereinafter referred to as 'the foundation disclosure') describes a distributed system of client and server software capabilities that cooperate to provide messaging privacy services. That system, which is being marketed under the name ArmorPost, makes two significant assumptions about its operating environment.

First, the Trusted Courier is a single network element owned by a single entity. While this serves the needs of that single entity, and provides effective service for all users, it is not possible to establish competing yet inter-operating message privacy services using the single-Courier design described in the foundation disclosure. Further, it may be difficult for security-sensitive organizations to deploy a Trusted Courier as described in the foundation disclosure inside their enterprise networks and thereby exert a measure of control over their private messaging traffic.

What is needed, then, is an extension to the system described in the foundation disclosure which allows for multiple Trusted Couriers to operate independently of one another with respect to their own users, yet interoperate with one another to transport Private Messages and related services among their disparate user communities.

Second, the Trusted Courier represents a nexus through which both Private Messages and their corresponding Access Restrictions Messages flow. The fact that these messages are sent separately in time provides substantial security. However, an even greater degree of assurance against abuse of the Trusted Courier's unique position in the network can be achieved by routing those two messages through completely separate elements.

What is needed, then, is an extension to the system described in the foundation disclosure which allows for any Trusted Courier to be distributed across two network servers, which may be further distributed even to two physical sites separated by a significant distance, such that encrypted message content flows through one server while corresponding content key material flows through the other.

It is thus a principal aim of the present invention to create architectures and protocols for distributing and replicating the Trusted Courier, thereby enhancing its applicability and trustworthiness.

SUMMARY OF THE INVENTION

The present invention provides a private messaging system using trusted couriers to relay private messages as well as key material used to protect the private messages that is enhanced by the deployment of multiple independent yet interoperating Trusted Couriers. Preferably, the independent trusted couriers may be operated by independent organizations, some of which may compete with one another for users and others of which may support closed user communities. The present invention contemplates that any of these independent organizations may choose to operate multiple trusted couriers itself, whether for the purpose of aligning traffic distribution with enterprise network architecture, for the purpose of providing greater capacity than is achievable in a single node, or for any other reason.

It is also contemplated that any single trusted courier may be deployed in such a way as to separate the handling of private message content and access restrictions messages that contain key material. While the basic methods for such handling are described in Provisional Application 60/466,910, the present invention provides enhanced methods that ensure the two messages which correspond with one another are not handled in the same network element. In other words, key material used to protect a particular private message is handled by a set of network elements that are at least partially and preferably wholly independent of the network elements used to convey the private message.

The above and other advantages of the present invention are carried out in one form by a system of cooperating elements, each of which applies cryptographic and other procedural means as specified below to effect the desired distribution and replication of trusted couriers, while continuing to ensure the privacy of each message as it is conveyed from its sender to its recipients across multiple couriers and courier partitions, as well as continuing to permit the establishment and enforcement of access restrictions by that sender.

DESCRIPTION OF DRAWINGS

The invention will be better understood from a reading of the following detailed description in conjunction with the drawing figures, in which like reference designators are used to identify like elements and in which.

DETAILED DESCRIPTION OF THE PREFERRED EMBODIMENTS

Figure 1:
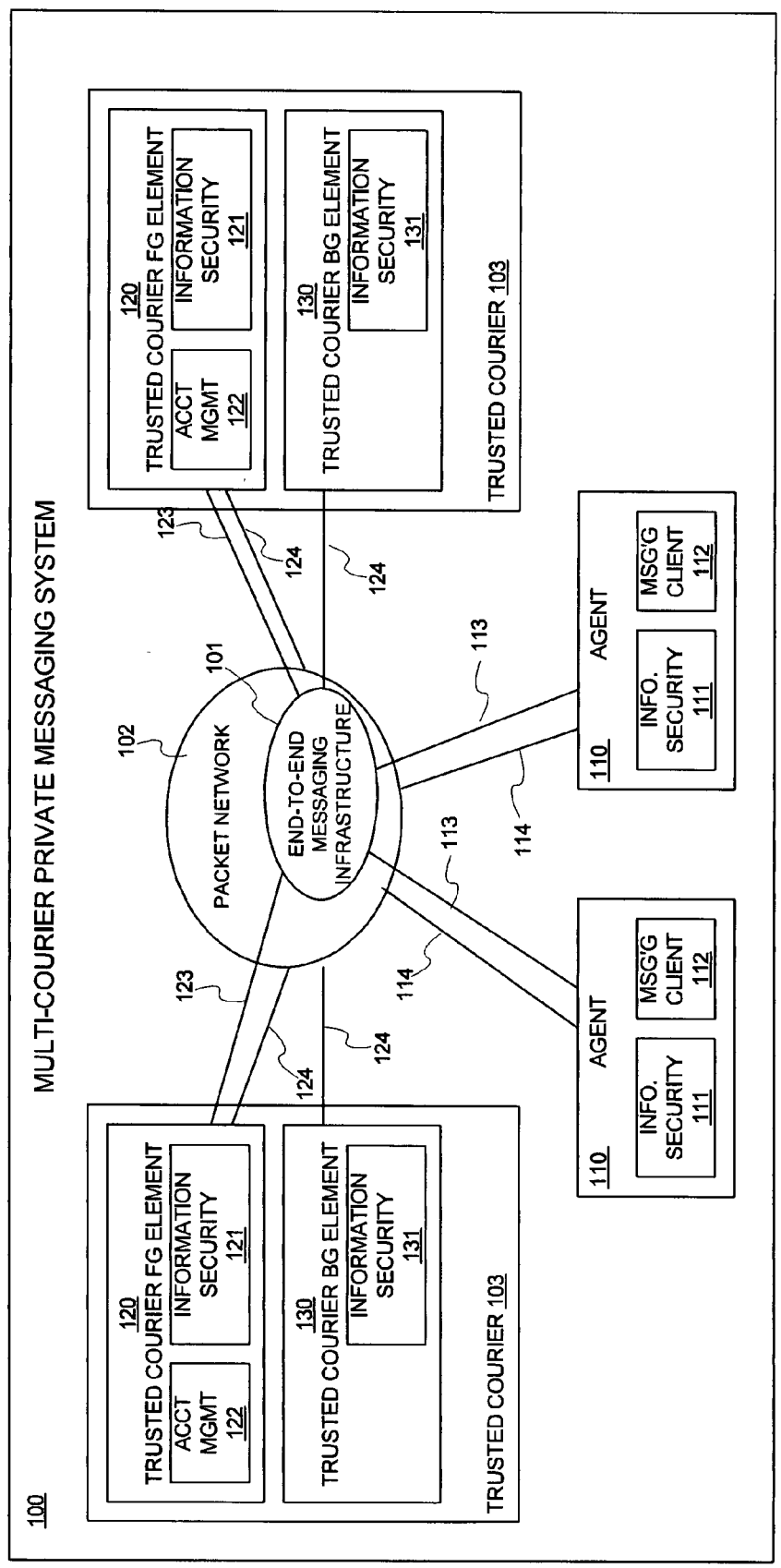
FIG. 1 illustrates a high-level block diagram of the multi-Courier Private Messaging system of the present invention.

In FIG. 1 Multi-Courier Private Messaging System 100 represents the system in accordance with the present invention. Four major elements make up this system. First, End-to-End Messaging Infrastructure 101 represents the messaging backbone to which the Private Messaging capability of the foundation disclosure, as enhanced by the present invention, is added. This Infrastructure can be any messaging system that allows users and/or software entities to exchange messages with one another. It is preferably the Internet-standard email service, but may also be implemented as an instant messaging service, a wireless short message service (SMS), any other messaging service, or any combination of these. Second, Packet Network 102 forms the foundation for all communication among elements, including End-to-End Messaging Infrastructure 101 and the messages exchanged thereon, but also supporting other non-messaging interactions such as web browsing. This element is preferably an Internet-based network, and may be the Internet itself, another network like it, or a composite of networks using multiple inter-networking technologies.

Third, connected to End-to-End Messaging Infrastructure 101 and Packet Network 102 are one or more Agents 110, which are computer software applications and devices which enable the Private Messaging capability for an end user. Each Agent 110 is a composite of some existing Messaging Client 112, an Information Security component 111, an interface 113 to the Messaging Infrastructure 101, and an interface 114 to the Packet Network 102. Agent 110 and its components are described in detail in the foundation disclosure, and are used here exactly as they are there.

Fourth, also connected to Messaging Infrastructure 101 and Packet Network 102 are a plurality of Trusted Couriers 103. These fill the same functional role as the Trusted Courier described in the foundation disclosure. However, where that system included only a single Trusted Courier, here any number may appear. This replication of the function satisfies the multiple ownership and traffic dispersion goals cited above.

In the present invention each Trusted Courier 103 comprises a Background and a Foreground element, such that Background and Foreground signaling as defined in the foundation disclosure are handled in completely separate Courier elements. This enhances the security of the system because with foreground and background signaling handled separately, the content of any single Private or Restricted Message cannot be decrypted by any Trusted Courier. This satisfies the distribution goal cited above.

Each Trusted Courier 103 comprises two elements. Trusted Courier Foreground Element 120 is substantially identical in every way to Trusted Courier 120 from the foundation disclosure. Trusted Courier Background Element 130 is based on Trusted Courier 120 from the foundation disclosure, and its Information Security module 131 is substantially identical to Information Security module 121 from the foundation disclosure. Trusted Courier Background Element 130 differs from the previous Trusted Courier 120 in that it lacks an Account Management module; no such module is necessary in Trusted Courier background element 130 because the Account Management module 122 in its corresponding Trusted Courier foreground element 120 serves for the entire Trusted Courier 103. It also differs in that it has no Interface 123 to Messaging Infrastructure 101; because Trusted Courier background element 130 handles only background element signaling, it interacts directly with Agents 110 and other Trusted Courier background elements 130 only via its Interface 124 and Packet Network 102.

Note that there is no direct interface within Trusted Courier 103 between Courier foreground element 120 and Courier background element 130. This attribute prevents abuse of Trusted Courier 103's sensitive position in the message flow network. The few interactions that are required between Courier foreground element 120 and Courier background element 130, which will become clear as the methods of the present invention are explained below, take place through Packet Network 102 on their respective Interfaces 124. This interface choice also provides a great deal of architectural flexibility in the deployment of Trusted Couriers 103. Courier foreground element 120 and Courier background element 130 may be situated as close to or as far from one another as their operator deems appropriate. For example, they may be deployed in the same room on the same Internet access interface, in different cities, or using any topology in between. It is also conceivable that they may be implemented as separate processes in the same computer, although this is not expected to be common or advisable due to security concerns. The foundation disclosure details the structure and functionality of Agents 110 and Trusted Courier Elements 120/130, which description is incorporated herein by reference.

Figure 2:
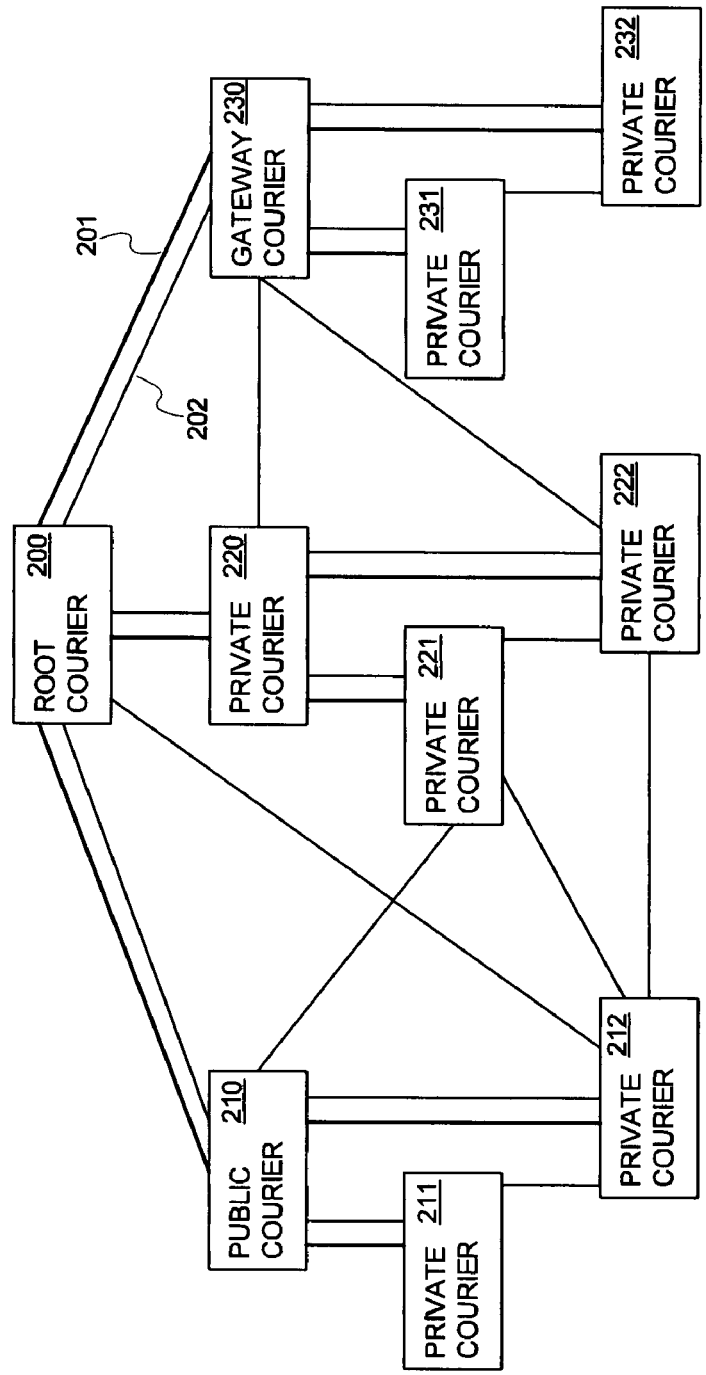
FIG. 2 illustrates a block diagram exemplifying the topology of the Courier Network of the present invention.

FIG. 2 shows a schematic summary of the possible topologies in which the multiple Trusted Couriers 103 of Multi-Courier Private Messaging System 100 may be arranged relative to one another. This figure depicts four distinct organizational roles a Trusted Courier 103 might play in the network, along with two distinct inter-Courier relationships. The organizational roles represent different sets of constraints on certain significant behaviors, which make each particular role suitable for certain types of organization. The relationships pertain to how these Couriers interact with one another to form networks. Note that these relationships represent meaningful interactions, not direct communication links. All communication takes place via Packet Network 102. Also note that Agents 110 are not shown in this diagram, but are instead implied. Each User and Agent is registered with and served by a single Courier. Thus each Trusted Courier 103 forms an island of service, and with respect to the Private Messaging service acts as a gateway for its registered Agents/Users. The relationships among Trusted Couriers 103 represented in FIG. 2 insulates those Agents 110 from one another, particularly with respect to encryption/authentication certificates.

As was stated in the foundation disclosure, simplification of the User's encryption/authentication experience is a significant benefit of the Private Messaging system, and this is accomplished by having the Trusted Courier act as a proxy for all other correspondents. This leads directly to the purpose of Relationships 201 (indicated by bold lines in FIG. 2), which are between one Trusted Courier 103 and another Trusted Courier 103 which certifies the authenticity of the first by signing its encryption/authentication certificate. In order for every Agent 110 served by a Courier 103 to trust messages from every Agent 110 served by every other Courier 103, there exists a network of certificate authenticity in which every Trusted Courier 103 participates. This network is depicted in FIG. 2 as a pure hierarchy. Note that each Trusted Courier 103 has exactly one Relationship 201 superior, and may have many Relationship 201 inferiors. No peer Relationships 201 may exist, as there is no meaning within a certification hierarchy for such peering. Thus the Couriers 103, each of which is a Certificate Authority for its Agents 110 and any other Couriers 103 which subtend it, form a conventional Certificate Authority tree via their Relationships 201 with one another. At the top of this tree is Root Courier 200, which acts as the root Certificate Authority for the entire network. Conventional Public-Key Infrastructure technologies and techniques, well known to those skilled in the art, are used to form this tree.

The Root Courier 200 role is filled by exactly one Trusted Courier 103 in the network. In the preferred embodiment, this is the Trusted Courier 103 operated by the authors of the present invention, although the business environment will dictate whether this continues to be the case.

Public Courier 210 and Private Courier 220 represent Couriers 103 that are operated by different classes of organization, and which have different constraints on their service domain. A Public Courier is permitted to serve any User without constraints, while a Private Courier is constrained to serve only those Users whose addresses fall within the same network namespace as the Private Courier. For example, a Private Courier in a particular Internet Domain Name would only serve Users whose email addresses are also in that same Internet Domain Name. Typically, a major ISP or carrier would operate a Public Courier, while an Enterprise or small ISP would operate a Private Courier. For example, Public Courier 210 might be a major ISP serving numerous Users in multiple domains, while Private Couriers 211 and 212, which subtend it in the CA hierarchy, might be particular Enterprises that are customers of that ISP but operate their own Couriers for security reasons. As another example, Private Courier 220 might be the first Courier placed in service by a large Enterprise, which later installed Private Couriers 221 and 222 to diversify their traffic.

Figure 8A:
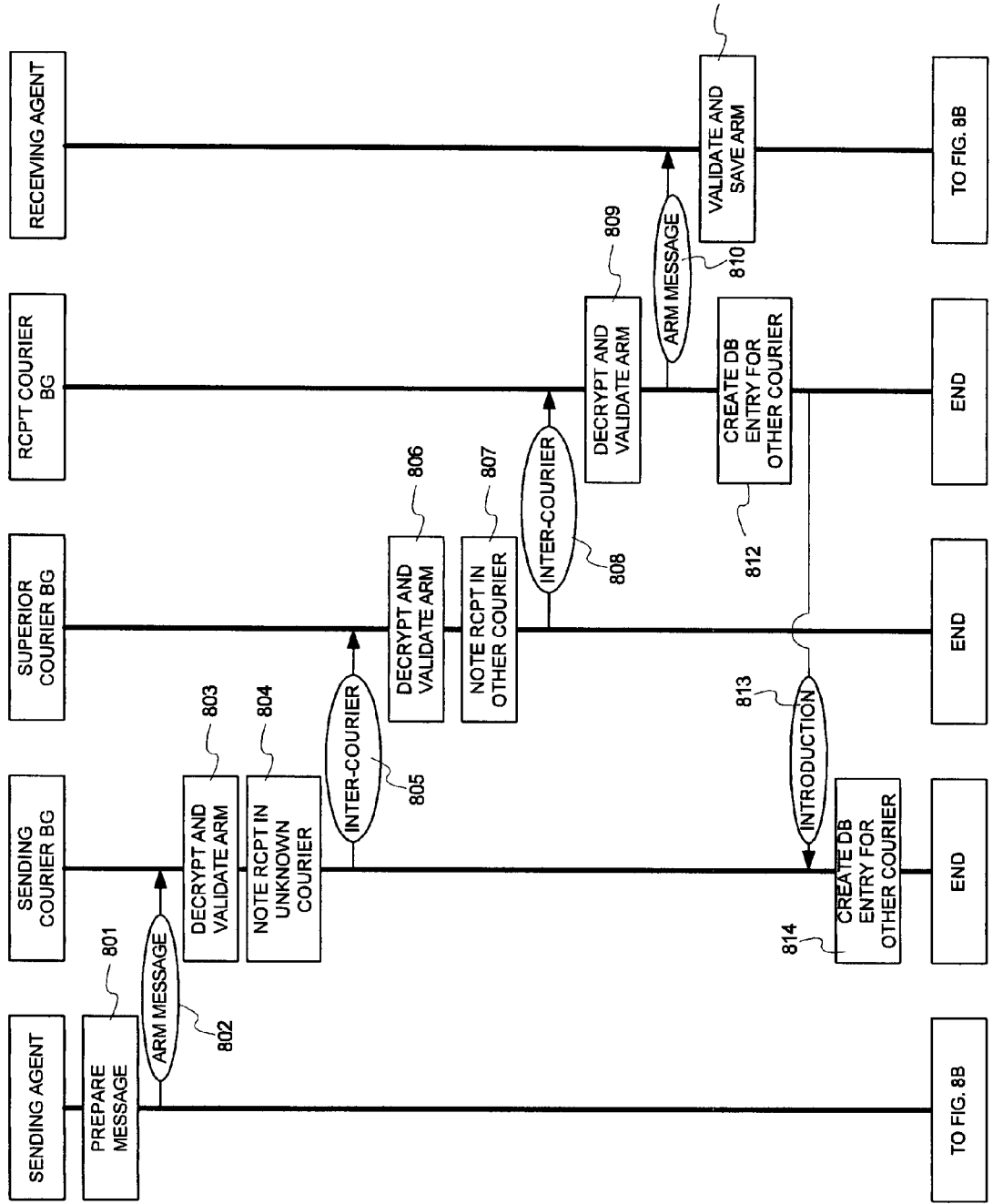
FIG. 8 illustrates a combination signaling sequence chart and flow chart for a Message Transfer involving two Trusted Couriers, which have not been previously introduced to one another, as well as the Deferral procedure which intervenes to ensure end-to-end flow and the Introduction procedure which follows to prevent future Deferrals between these two Trusted Courier pairs, in accordance with the present invention.
Figure 8B:
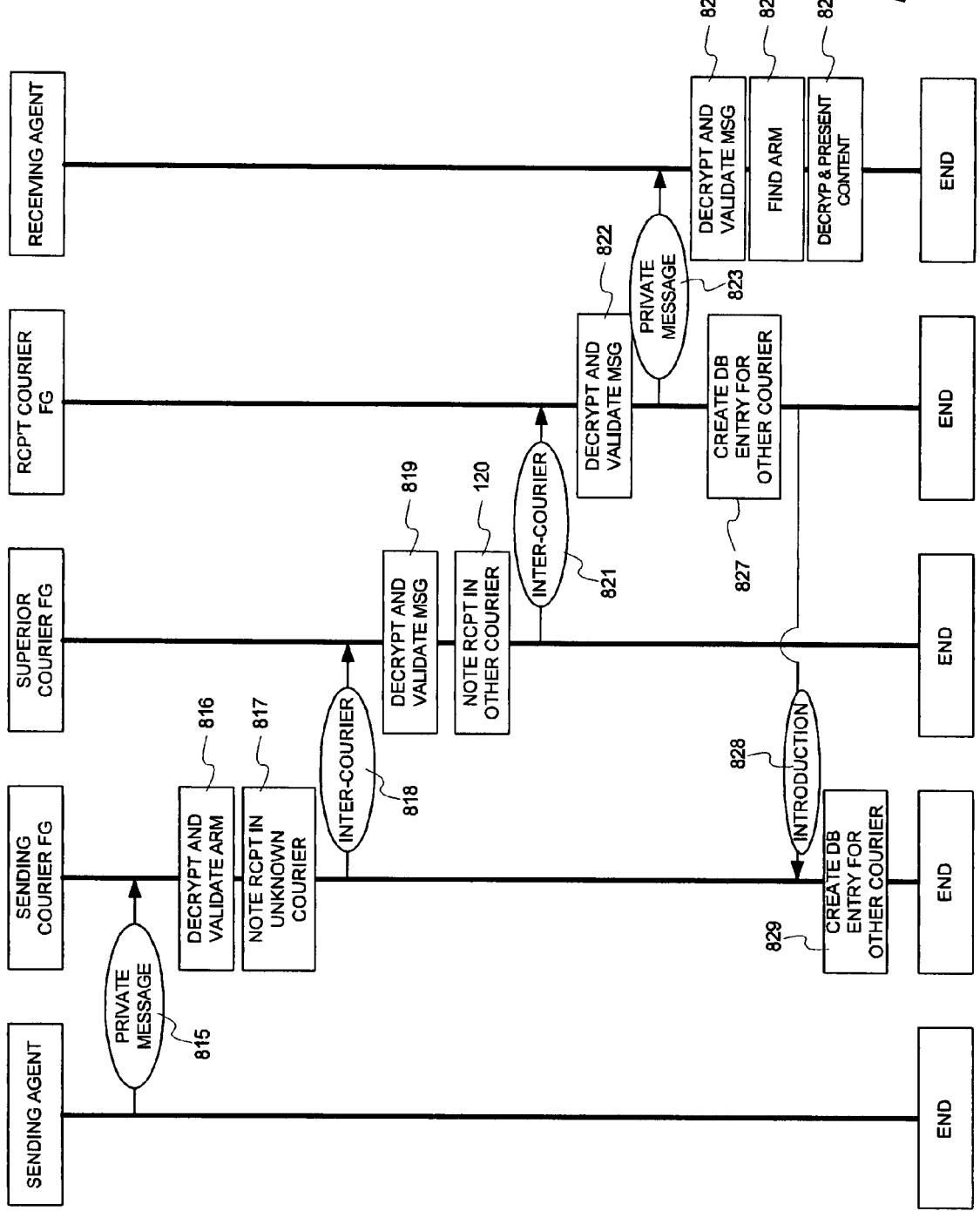
Figure 9A:
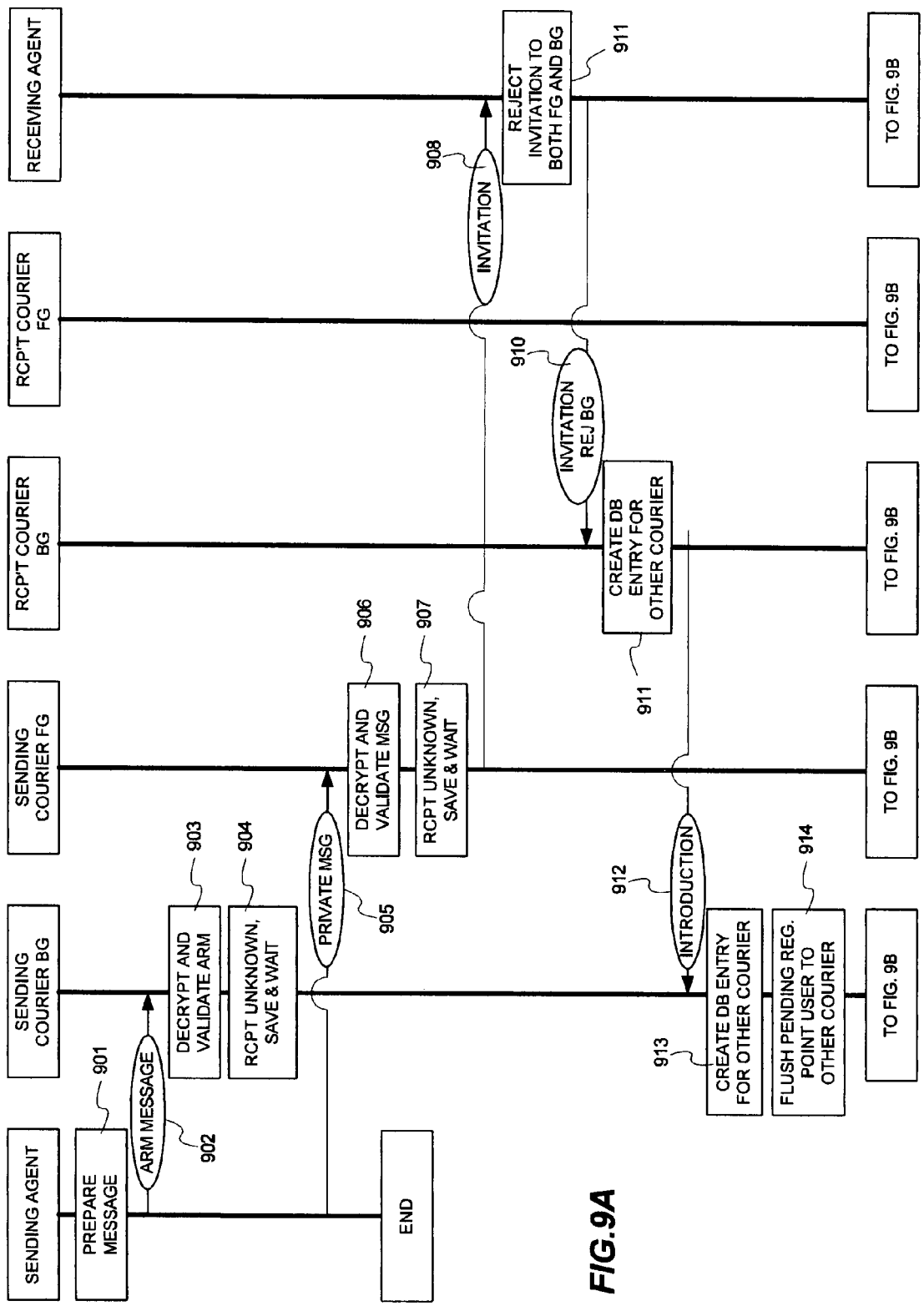
FIG. 9 illustrates a combination signaling sequence chart and flow chart for a Message Transfer involving two Trusted Couriers, the first of which Invites an Agent that is Registered in the second, as well as the Invitation Reject procedure which intervenes to ensure correct end-to-end handling, in accordance with the present invention.
Figure 9B:
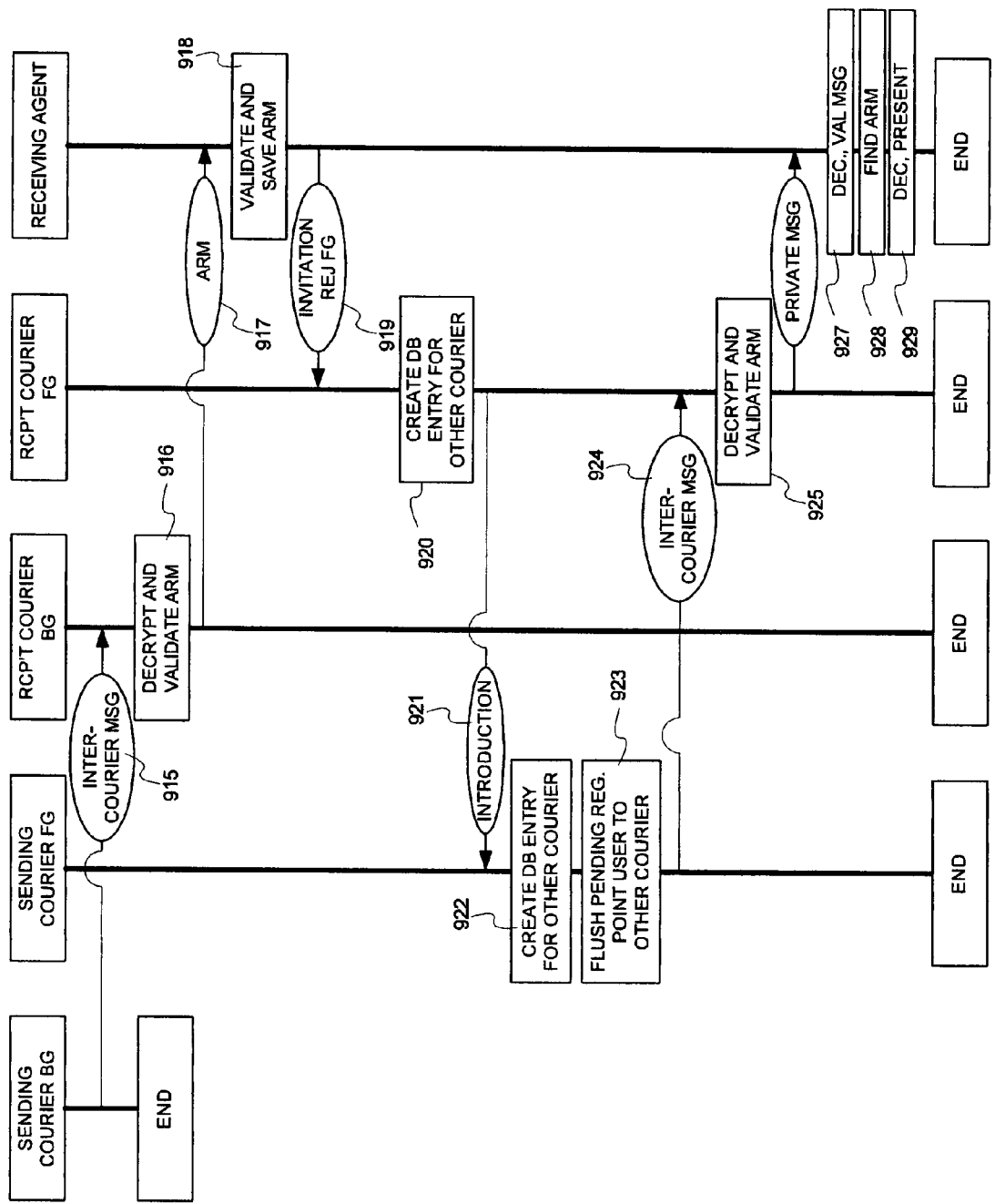

Behaviorally, the primary difference between Public and Private Couriers is how they handle recipient addresses that are not registered. A Public Courier will invite these Users according to the procedures in the foundation disclosure. Because there are no domain constraints on a Public Courier, this practice carries a risk of inviting a User who is already Registered in some other Courier, Public or Private. FIG. 9 depicts this situation, which will be described below. On the other hand, a Private Courier will Defer the message to its Relationship 201 superior because its domain of service is constrained. The superior Courier, and its superiors up to Root Courier 200 if necessary, will resolve the unknown recipient address. This situation is depicted in FIG. 8, which will be described below. Note that Root Courier 200 is also a Public Courier.

While the Relationship 201 hierarchy is appropriate for certificate authentication, it is not optimal for traffic flow. Relationships 202 (indicated by non-bold lines in FIG. 2) represent the opportunity for flow of Private/Restricted Messages, Access Restrictions Messages, and other traffic between Couriers 103 so related on behalf of their Agents 110. For such traffic to flow, the Couriers 103 involved have previously exchanged encryption/authentication certificates with one another so that information privacy and authenticity are ensured. Note that these certificates are governed by the certificate authenticity hierarchy formed of Relationships 201, so every participating Trusted Courier 103 may be assured of the others by validating the certificates up to the Root Courier 200. This exchange process is called Introduction, and the mechanics of it are depicted in FIG. 8, which will be described below. Here it is sufficient to note that any Courier 103 may be introduced to any other Courier 103, thus forming a traffic mesh according to the demand of the Agents 110 involved. Thus an optimal network is formed dynamically. Note that a Relationship 202 is automatically formed in parallel with every Relationship 201 as a corollary to the certificate authentication process. Additional Relationships 202 form as demanded by the traffic flow, and may appear anywhere.

Certain regulatory environments may exist which constrain the any-to-any formation of Relationships 202. In such situations a Gateway Courier 230 role is conceived which focuses all Introduction activity, and therefore all inter-Courier traffic, on itself for a particular segment of the network for which it is responsible. Note in FIG. 2 how Private Couriers 231 and 232 have no Relationships 202 which bypass Gateway Courier 230. Formation of this topology is a special case of the procedures described below, and requires no additional procedures. Gateway Courier 230 may also be either a Private Courier or a Public Courier, as the relevant behavioral characteristics for determining Public vs. Private or Gateway vs. non-Gateway are orthogonal to one another.

In FIGS. 3 through 9 we find the major methods which operate in the Multi-Courier Private Messaging System 100 that are different from or in addition to the procedures in the foundation disclosure. As Invitation remains unchanged from the foundation disclosure, we begin with Registration in FIG. 3. The change appears at the end of the process, but the description here will recap in abbreviated form the steps that have not changed as well.

Figure 4:
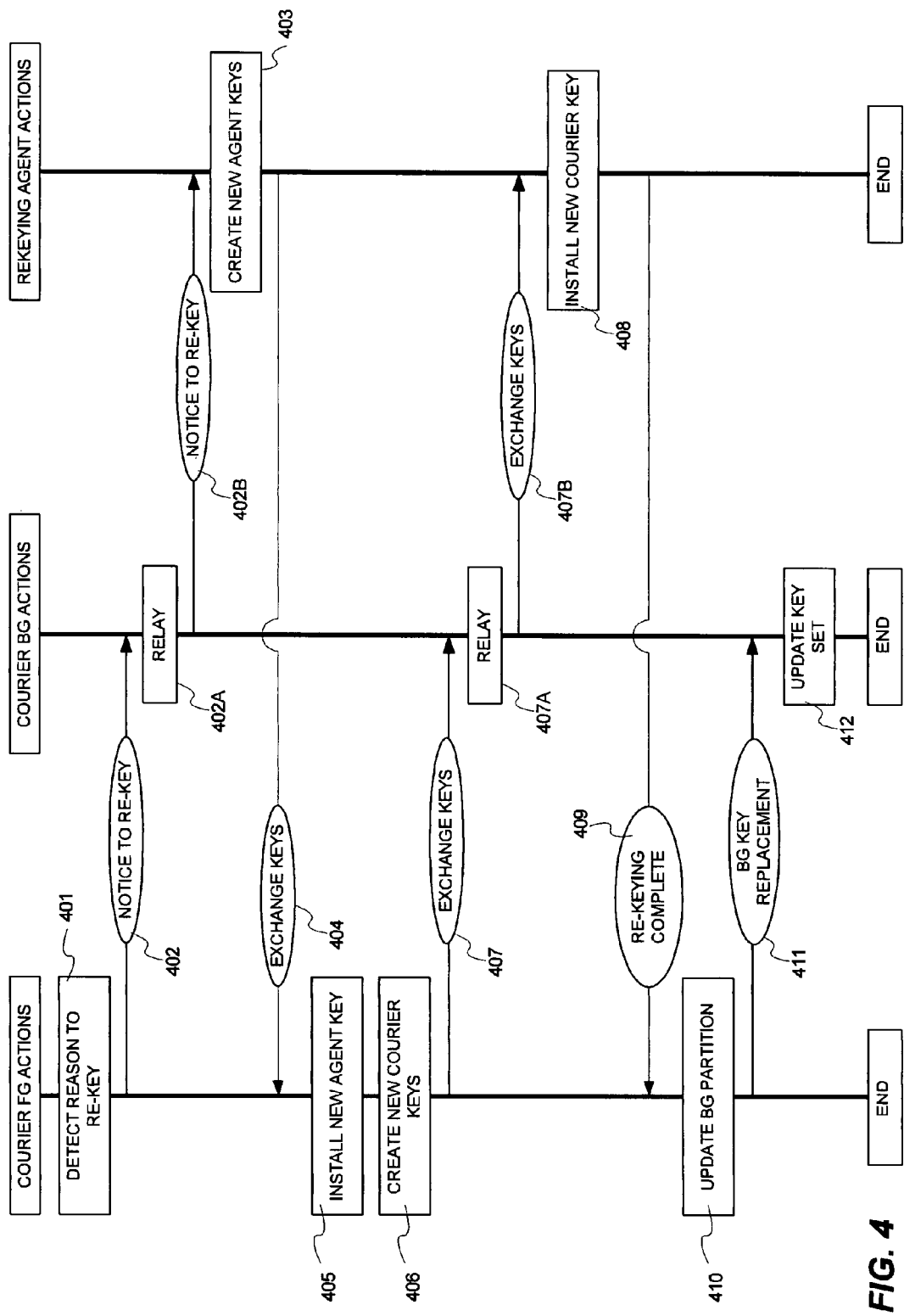
FIG. 4 illustrates a combination signaling sequence chart and flow chart for the Key Replacement process in accordance with the present invention.

Registration begins with step 301, in which the registering user receives an Invitation as described in the context of the foundation disclosure's FIG. 4. Imbedded in the Invitation message is a referral link, and in step 302 the user follows this link with a web browser and fills out the resulting form. Step 303 condenses the retrieval and submittal of the form, which appear as steps 503-506 in the foundation disclosure's FIG. 5.

Upon receipt of the completed form in step 303, Trusted Courier foreground element 120 will at step 304 create the user's account, and at step 305 construct an Agent Installer for the user. The Agent Installer is a software application that will install an Agent 110 in the user's computer or device. The Agent Installer package is downloaded to the user's computer or device in step 306, through the same secure path used by the registration form in step 303. The Agent Installer is executed in the User's computer or device at step 307. The foregoing steps 304-307 correspond exactly to steps 507-510 in the foundation disclosure's FIG. 5.

Figure 5A:
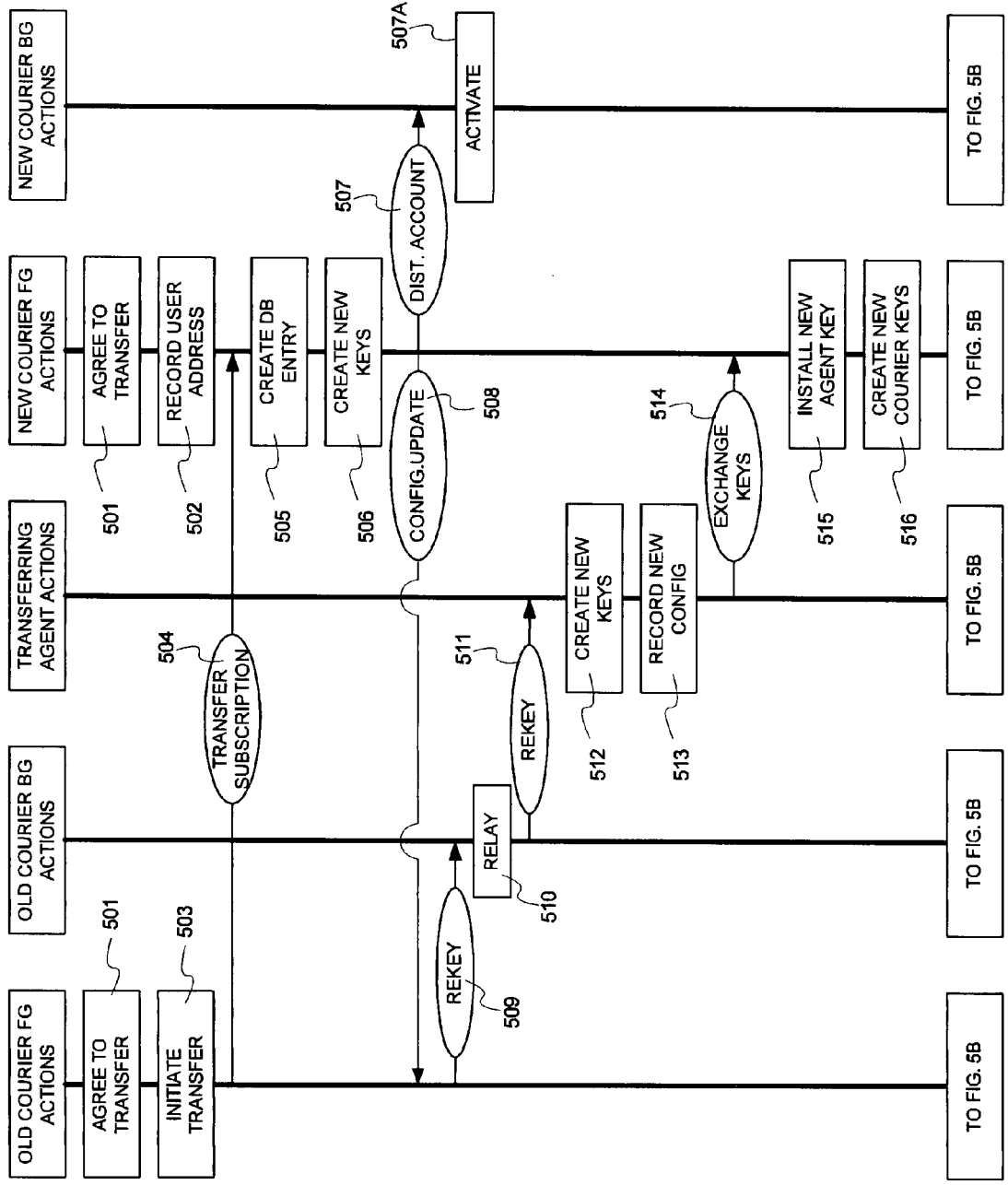
FIG. 5 illustrates a combination signaling sequence chart and flow chart for the Registration Transfer process in accordance with the present invention.
Figure 5B:
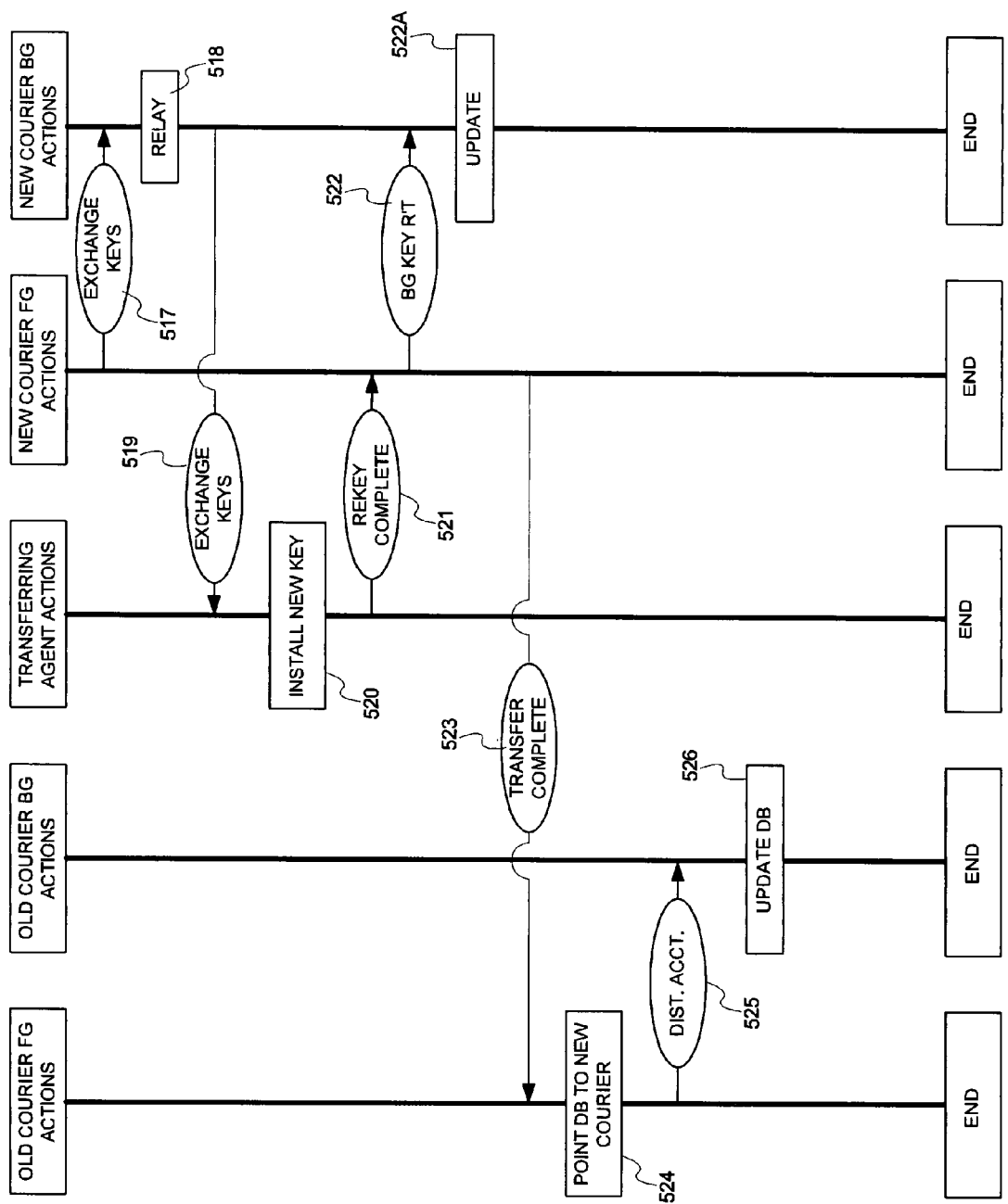

During installation, the installer establishes that it has landed in the right place, so its first action at step 308 will be to validate its configuration as described in step 511 of the foundation disclosure's FIG. 5, and prompt the User for a local password as described in step 512 of the foundation disclosure's FIG. 5. The User will create and enter the requested local password at step 309, and the Agent Installer will store it and create the necessary encryption keys at step 310; these steps correspond exactly to steps 513-515 in the foundation disclosure's FIG. 5.

Next, the Agent Installer and Trusted Courier foreground element 120 will in steps 311-313 exchange keys with one another and store the results of the exchange, in exactly the manner as described in detail for steps 516-520 of the foundation disclosure's FIG. 5. The foundation procedure concludes with an Agent Alive Indication message being sent by the Agent Installer to Trusted Courier foreground element 120 in steps 314-315, corresponding exactly with final steps 521-522 of the foundation disclosure's FIG. 5.

At this point, however, the present invention continues so as to ensure that both Trusted Courier foreground Element 120 and Trusted Courier background element 130 are operating with the same data regarding the Registering User and Agent 110. Step 316 shows Trusted Courier foreground element 120 sending a Distribute Account message to Trusted Courier background element 130. This message carries the User's and Agent's addresses, along with encryption keys for both Courier and Agent. The Registration procedure concludes at step 317 with Trusted Courier background element 130 activating its view of the User's account.

Note that both foreground element and background elements will operate with the same keys, including the Courier-end private key. While this is perhaps unconventional compared with prior-art public-key cryptography, it permits Agent 110 to be somewhat simpler than would be the case if Trusted Courier foreground element 120 and Trusted Courier background element 130 used separate keys to communicate with Agent 110. In particular it avoids the necessity to execute the Key Replacement procedure with both halves of the Trusted Courier 103.

FIG. 4 depicts an exemplary process of replacing cryptographic keys. Functionally, steps 401-409 correspond exactly to steps 601-609 of the foundation disclosure's FIG. 6, and so are not detailed further. However, due to the separation of foreground element and background element steps 402 and 407 are extended as described here, and additional steps 410-412 are required to synchronize the two elements in the Courier. Trusted Courier foreground element 120 drives the Key Replacement process from the perspective of Trusted Courier 103, but Trusted Courier background element 130 participates in two ways. First, because Agent 110 can only receive background messages from Trusted Courier background element 130, the Notice to Rekey and Exchange Keys messages are relayed through it. Therefore steps 402 and 407, respectively, depict these messages going not directly to Agent 110 but to Trusted Courier background element 130, which performs a relay function in steps 402a and 407a. The messages then go to Agent 110 at steps 402b and 407b, respectively. Note that the Exchange Keys message in step 404 and the Rekeying Complete message in step 409, though logically background messages, can nevertheless be sent straight into Trusted Courier foreground element 120 by Agent 110 due to the nature of the underlying messaging protocols. Second, because Trusted Courier background element 130 does not participate logically in the Key Replacement that concludes at step 409, it is informed of the result by Trusted Courier foreground element 120. The latter does so at step 410, conveying to the former in step 411 a background element Key Replacement message that carries the new keys for both Trusted Courier 103 and Agent 110. Trusted Courier background element 130 records these new keys in its database at step 412.

Figure 3:
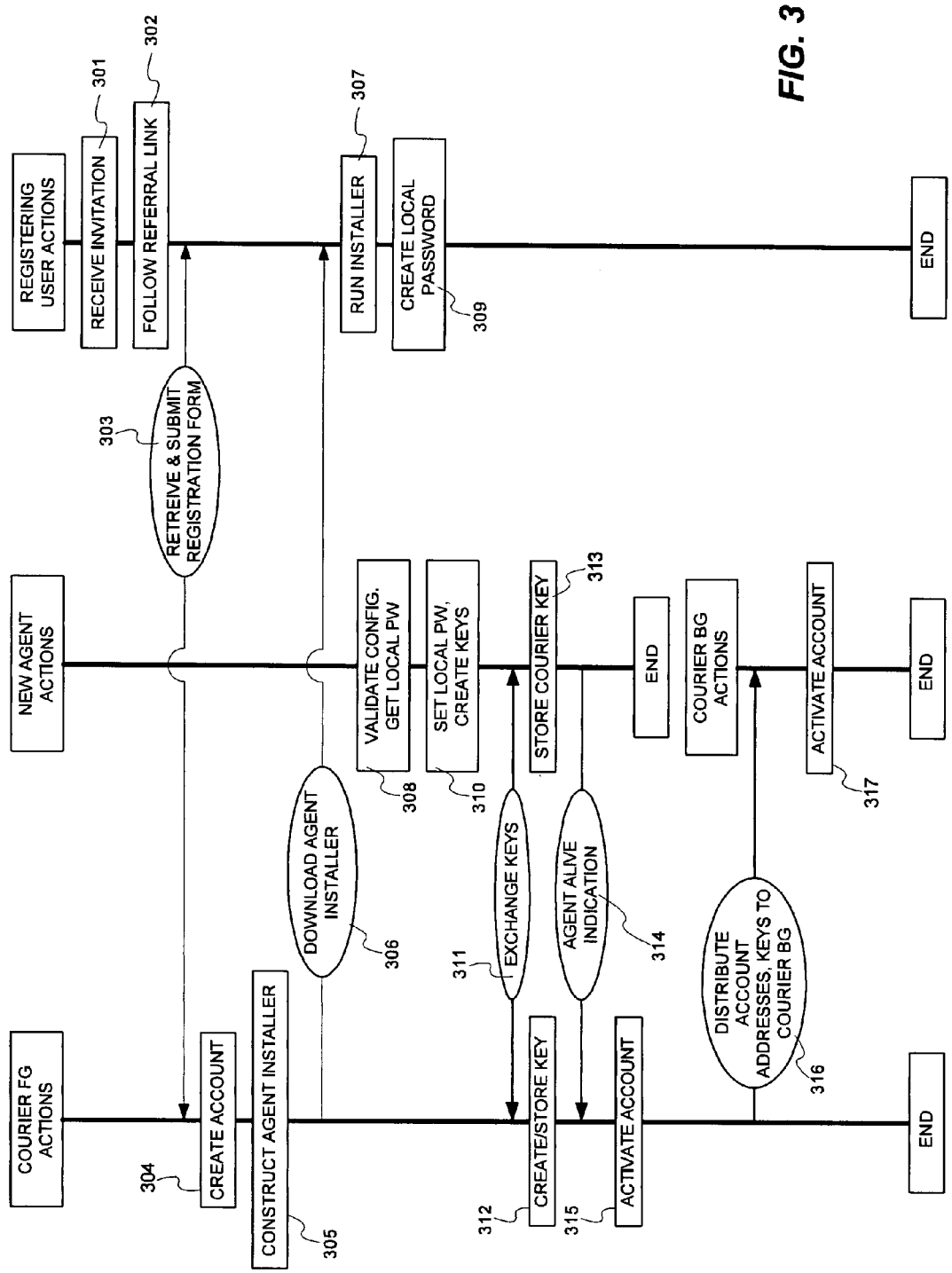
FIG. 3 illustrates a combination signaling sequence chart and flow chart for the Registration process in accordance with the present invention.

The observant reader will note that in neither the Registration process of FIG. 3 nor the Key Replacement process of FIG. 4 does Trusted Courier background element 130 respond to Trusted Courier foreground element 120 after receiving the database updates. The principle being followed here is that Courier background element 130 is subservient to Courier foreground element 120 and cannot have any opportunity to reject the update. In addition, the absence of any routine signaling from Courier background element 130 to Courier foreground element 120 contributes further to the prevention of any potential abuse whereby Courier background element 130 might relay an Access Restrictions Message to Courier foreground element 120 and subvert the separation.

With multiple Trusted Couriers 103 in the network, it is inevitable that Users will migrate among them in certain situations. As the network of Couriers owned by a single operator grows, for example, that operator will want to distribute the Users among the various Couriers 103 for appropriate load balancing and optimal traffic flow. Public Couriers as well will tend to compete with one another for Users, so some churn is to be expected in the network. Both situations require a controlled mechanism for moving a User's Registration from one Courier 103 to another. The procedure used to do this will optimally involve the operators of both Couriers 103 (even when they are the same entity), so that no question will arise as to whether a particular transfer was appropriate. It should never be possible for the operator of a Trusted Courier 103 to 'slam' a User's Registration unilaterally. Further, while a User should be able to trigger a transfer, the process itself should be handled automatically without additional User intervention.

FIG. 5 depicts a Registration Transfer procedure that satisfies these requirements. The process begins with the operator(s) of the two involved Trusted Couriers 103 agreeing at step 501 to perform the transfer of a particular User. This is a business-process step that may or may not involve automation but definitely involves human decisions. As such the details of this part of the procedure will vary among different operators and are not further specified here. In the case of a User-initiated transfer, this decision step also offers the operator of the old Courier 103 an opportunity to attempt various marketing actions that might retain the customer.

Once the transfer is agreed, the respective operators will set the system to perform it. In step 502, the operator of the Courier 103 that will gain the User, termed here the 'new' one, will through an administrative action record the transferring User's messaging address such that 'new' Courier foreground element 120 will accept the transfer and execute the automated steps involved. At the same time, in step 503 the operator of the Courier 103 that will lose the User, termed here the 'old' one, will through an administrative action initiate the automated portion of the procedure. Note that this implies the 'old' Courier 103 and its operator cooperate in the transfer, in fact to the point of actively relinquishing the User. Between this and the continued use of cryptographic authentication throughout the process, slamming is quite impossible.

The automatic portion of the Registration Transfer procedure commences then at step 504, wherein the 'old' Courier foreground element 120 transmits the User's subscription data and Agent key to 'new' Courier foreground element 120 in a Transfer Subscription message. Note that, as with Registration and Key Replacement, Courier foreground element 120 drives the process, only informing Courier background element 130 after certain key steps.

Note also that this message is preferably encrypted to protect its sensitive content, as are all others in the system of the present invention and the foundation disclosure.

Upon arrival of the Transfer Subscription message, 'new' Courier foreground element 120 at step 505 creates a database entry for the transferring User using the information in the message. At step 506 it creates new keys for itself which are to be used in communicating with the User's Agent 110. At this point 'new' Courier background element 130 needs to know about this User, so step 507 conveys the necessary information in a Distribute Account message that is substantially identical to the one in step 316 of FIG. 3. 'New' Courier background element 130 records this information in step 507a to activate this User's support there.

Now that 'new' Trusted Courier 103 is prepared to accept the transferring User, 'new' Courier foreground element 120 informs 'old' Courier foreground element 120 of the parameters required for Agent 110 to access the new account by sending a Configuration Update message to 'old' Courier foreground element 120 at step 508. These parameters include network names and addresses for the servers that comprise 'new' Trusted Courier 103, as well as the messaging addresses and encryption/authentication certificate to be used by Agent 110 when communicating with 'new' Courier 103. Because this information goes first to 'old' Courier 103 and not directly to Agent 110 from 'new' Courier 103, slamming by arbitrary would-be 'new' Couriers 103 is prevented.

The next several steps in the Registration Transfer are actually a special case of the Key Replacement procedure, in which the 'old' Courier 103 commands Agent 110 to exchange keys with 'new' Courier 103. At steps 509-511, the Notice to Rekey message is sent from 'old' Courier foreground element 120, through 'old' Courier background element 130 acting as a relay, to Agent 110, just as it is in steps 402-402b of FIG. 4. The difference here is that this message also carries the new configuration data pointing to 'new' Courier 103, which was conveyed previously in the Configuration Update message at step 508. Agent 110 acts upon the Notice to Rekey at step 512 by creating new keys for itself, just as it does in step 403 of FIG. 4. In addition, at step 513 it acts upon the new configuration data in the message by changing its own configuration so that it refers to 'new' Courier 103. All subsequent interactions with a Trusted Courier 103 will thus take place with 'new' Courier 103.

The remainder of the Key Replacement is the same as in FIG. 4. Steps 514-521, in which Agent 110 and 'new' Courier 103 exchange their new keys and record them accordingly, are substantially identical to steps 404-409. Similarly, the Background Key Replacement that occurs in steps 522 and 522a, whereby 'new' Courier foreground element 120 informs 'new' Courier background element 130 of the completed Key Replacement, is substantially identical to the one in steps 411 and 412.

Because the aforementioned Key Replacement occurs in the context of the ongoing Registration Transfer, 'old' Courier Pair 103 as the originator of the transaction is still unaware at this point that it has been completed. Therefore the new state of affairs are propagated back to 'old' Courier 103. The Transfer Complete message in step 523 provides this closure. This message is sent from 'new' Courier foreground element 120 to 'old' Courier foreground element 120 in parallel with the background element Key Replacement in step 522. Upon arrival, 'new' Courier foreground element 120 at step 524 changes the User's database entry so that it refers to 'new' Courier 103 as the correct handler for this address, and propagates this change to 'old' Courier background element 130 in steps 525 and 526. Note that the Distribute Account message in step 525 is semantically identical to message of the same name in step 507, although the specific update to the account data is different in each case. At any rate, subsequent attempts to send a message to the transferred User or the corresponding Agent 110 via the 'old' Courier 103 will therefore be rerouted to the 'new' Courier 103. At this point the User and corresponding Agent 110 are safely hosted on 'new' Trusted Courier 103 and no longer hosted on 'old' Trusted Courier 103.

Figure 6A:
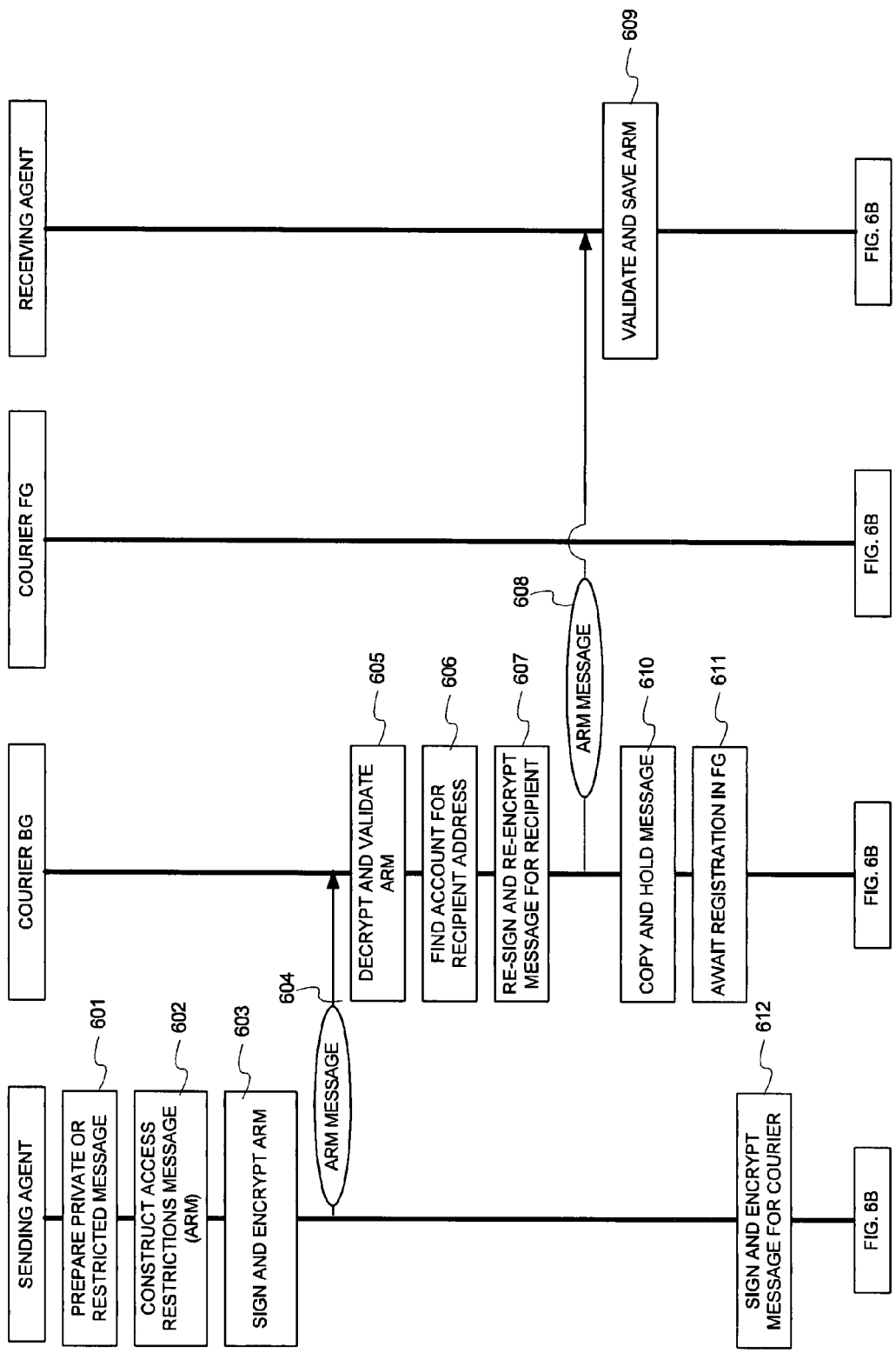
FIG. 6 illustrates a combination signaling sequence chart and flow chart for a Message Transfer involving a single Trusted Courier with separate foreground and background elements in accordance with the present invention.
Figure 6B:
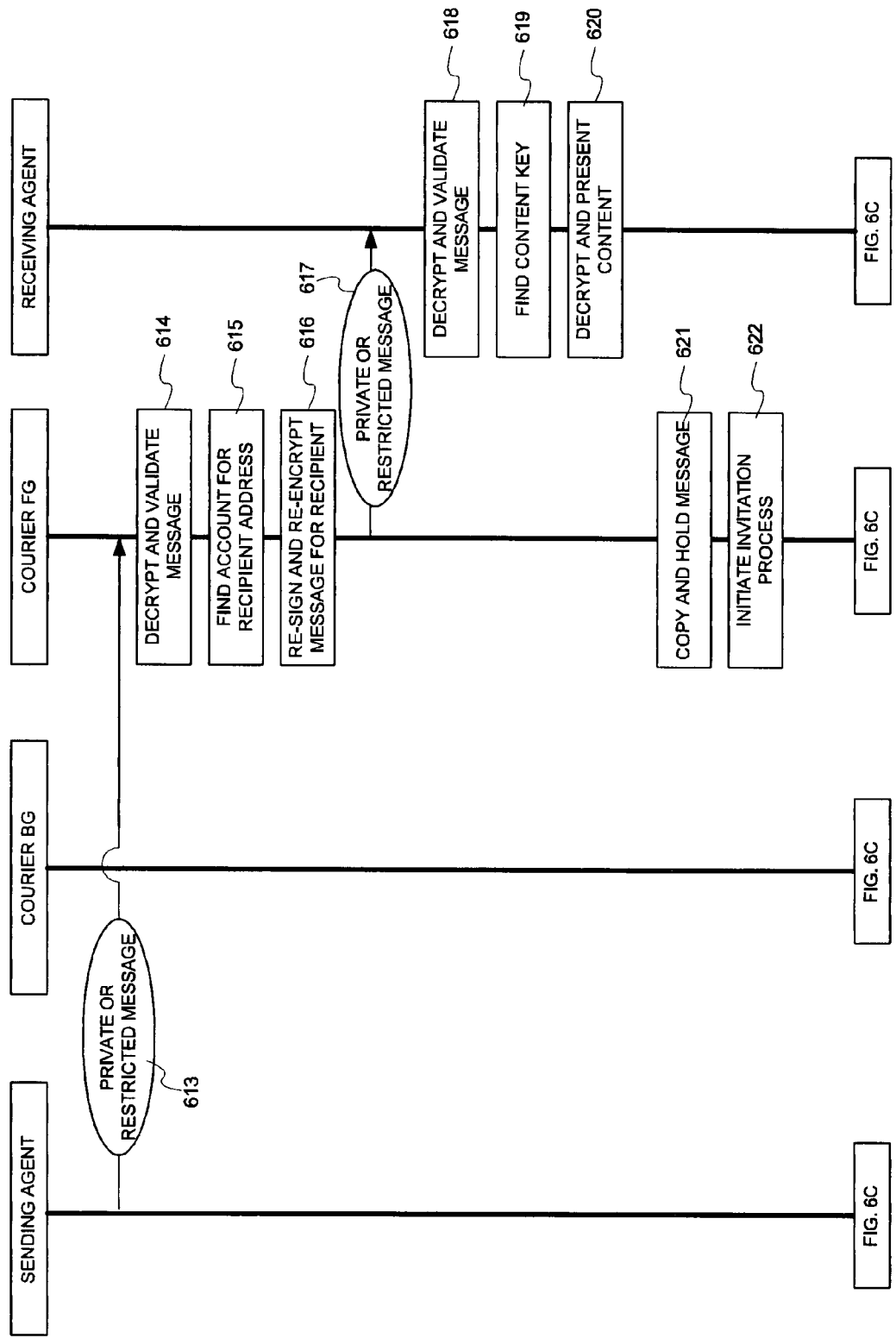
Figure 6C:
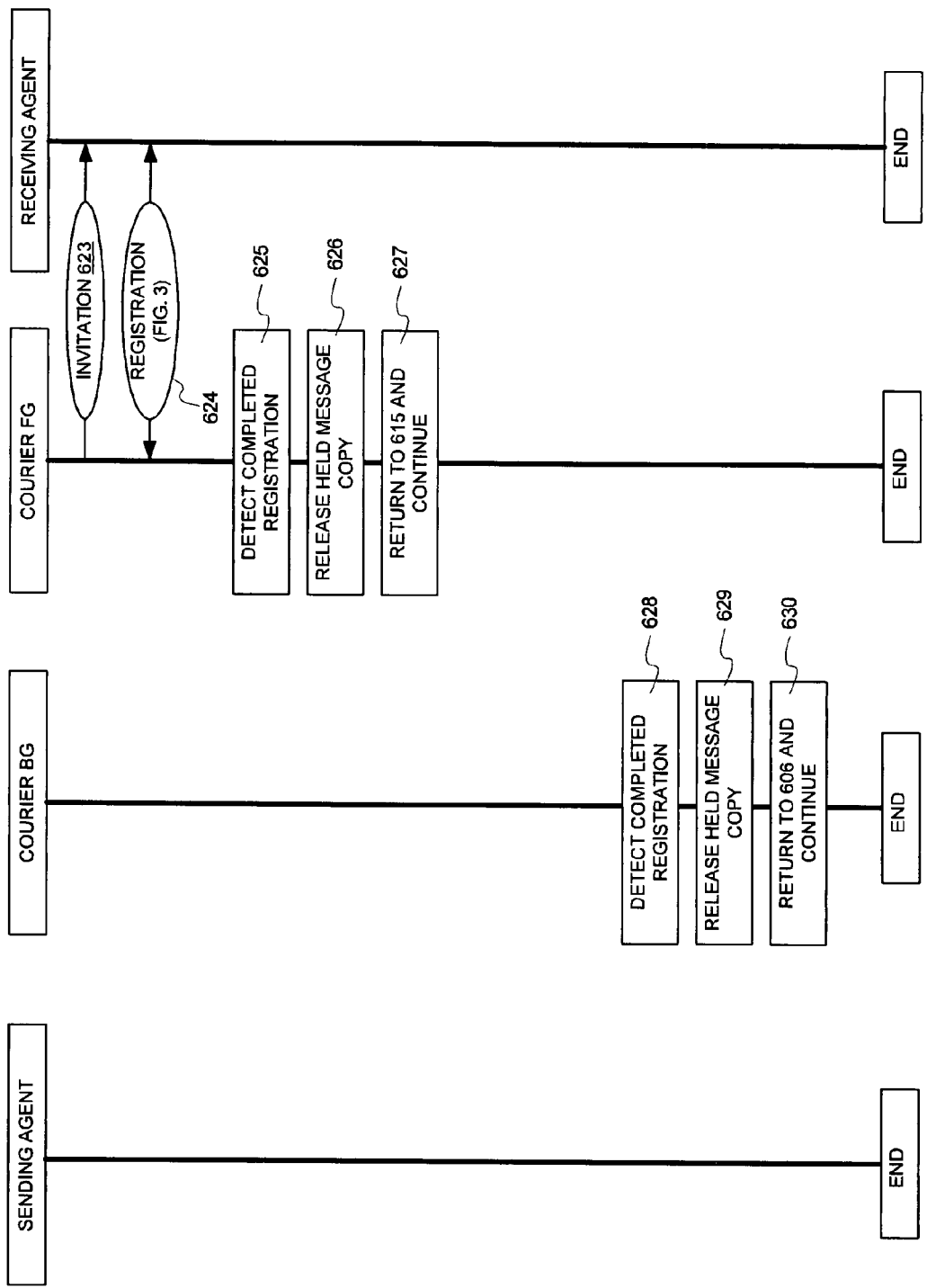

As long as the User's Registration status is active and stable, that is, not in the process of executing one of the preceding procedures, the corresponding Agent 110 may create and send Private or Restricted messages to correspondents via the Trusted Courier 103 with which Agent 110 is associated. FIG. 6 depicts exemplary processes which are followed to do so when both sender and recipients are served by the same Courier 103. This diagram is derived from FIG. 7 of the foundation disclosure, condensed for brevity where no change has been made and enhanced where necessary to describe what changes in the context of the present invention.

First, at step 601 the sending User and Agent 110 will prepare the message, including composing it, marking it as Private or Restricted as appropriate, and commanding that it be sent. Also embodied in this step are the various conversion, encryption, and formatting actions that take place afterward, including construction and storage of the ARM Record. Though combined into a single step here, these items are substantially identical to steps 701-705 of FIG. 7 in the foundation disclosure.

The Private or Restricted message thus prepared, it is set aside for the moment so the ARM Record can be sent first. Step 602 provides for the construction of an Access Restrictions Message using the same recipient lists as the Private or Restricted message being processed, and containing the corresponding ARM Record. As detailed in the foundation disclosure, it is via this separate message that the ARM Record is conveyed to the recipients of the Private or Restricted message such that end-to-end message privacy is assured. In step 603, the Access Restrictions Message so composed is signed and encrypted according to the S/MIME email encryption standard (IETF document RFC1847) and sent to Trusted Courier Background 130. Step 604 shows the Access Restrictions Message being transported to Courier background element 130 and carrying both the Message Identifier and the Content Encryption Key, which are elements of the ARM Record. Upon arrival of the Access Restrictions Message at Courier background element 130, at step 605 it is decrypted and validated. These steps 602-605 taken together are substantially identical to steps 706-710 of the foundation disclosure.

At this point the order of processing differs due to the separation of background and foreground handling into distinct elements. Where in the foundation disclosure it is the Access Restrictions Message that triggers Invitation of any unknown recipients, in the present invention that message is handled in Courier background element 130 and is held pending Registration of unknown recipients by Courier foreground element 120.

Thus for each recipient in the message header that is a Registered address, Courier background element 130 will in steps 606 and 607 find the appropriate set of keys, use them to create the S/MIME signature and transport encryption for the Access Request Message, and send the signed and encrypted Access Request Message to that recipient. Step 608 depicts this message in transit to the recipient, whose Agent 110 will in step 609 decrypt and validate the Access Restrictions Message, then store the enclosed ARM Record. These steps are substantially identical to steps 718-721 in FIG. 7 of the foundation disclosure. Again, this sequence is repeated for each known recipient.

Now in step 610, Courier background element 130 will make a copy of the Access Restrictions Message for each recipient that isn't already Registered in the system, creating a new database entry for each one in preparation for their eventual Registration. Step 611 depicts Courier background element 130 quiescing at this point to await notice from Courier foreground element 120 that the Registration has completed; this occurs, as usual, for each of the relevant addresses. Processing will resume at step 628, but first the foreground handling is described. Note that good server hygiene practice will dictate that an implementation audit these outstanding messages and clean up any that have not been released within a reasonable time.

Returning to the sender's Agent 110, the foreground message with the actual encrypted content, which was prepared previously in step 601, is wrapped in an S/MIME package (signed and encrypted) in step 612 and sent to the Courier foreground element 120 in step 613. Courier foreground element 120 unwraps the S/MIME package (decrypt and validate) in step 614. This sequence is substantially identical to steps 722-726 in FIG. 7 of the foundation disclosure. Note that the Courier Receipt and corresponding process steps described in the foundation disclosure are implied here, though not shown in FIG. 6 for the sake of brevity.

Now Trusted Courier foreground element 120 steps through the list of recipients' addresses in the header, determining which refer to registered users and which are unregistered as did Trusted Courier background element 130 above. For each Registered recipient address, Courier foreground element 120 will retrieve the correct keys in step 615, rewrap the foreground message in an S/MIME package (signed and encrypted) in step 616, and send it to the corresponding Agent 110 in step 617. This sequence is substantially identical to steps 727, 729, and 730 in FIG. 7 of the foundation disclosure. As these messages arrive at their respective destinations, each recipient's Agent 110 will decrypt and validate the S/MIME package in step 618, find in step 619 the ARM Record stored previously at step 609, and use the content encryption key kept there to decrypt and present the message in step 620. This sequence is an abbreviated depiction of the detailed process described in the foundation disclosure. Specifically, steps 615-620 here are meant to be substantially identical to steps 727-738 there.

The following sequence is repeated for each unknown recipient. Upon recognizing that the recipient address is not Registered, at step 621 the foreground message at hand will be copied into a new database entry created in anticipation of the addressee's eventual Registration. Courier foreground element 120 will then, in step 622, initiate the process of Inviting the recipient to Register. This process is described in full in the foundation disclosure; it is used here exactly as it is there, and is represented here as a message flowing to the addressee in step 623. Following Invitation, the User's natural response is Registration, depicted here as an interaction between Agent 110 and Courier foreground element 120 in step 624. This process has already been described in the context of FIG. 3. Note that the final steps of Registration include notifications at both Courier foreground element 120 and Courier background element 130. These final steps are used as triggers by which each element detects that Registration is complete. Thus at step 625, Courier foreground element 120 makes this detection, and so at step 626 it releases the held copy of the foreground message previously stored for the particular recipient whose Registration has just concluded. At step 627, then, Courier foreground element 120 returns to step 615 and processes the message for transmission to the recipient. Similarly, at step 628 Courier background element 130 detects the completed Registration, at step 629 releases the held Access Restrictions Message for that recipient, and at step 630 returns to step 606 to process the background message for transmission to the recipient's Agent 110. Once again, these steps are repeated for every Invited recipient that completes Registration. For those that don't after a reasonable time, implementations should practice good hygiene and purge them.

The remaining diagrams depict various message flow scenarios involving multiple Couriers 103. So that these next sections do not entail the complication of describing the looping over multiple recipients, each scenario is shown with only a single recipient. However, it should be apparent that the system supports multiple recipients per message, and in fact the multi-recipient looping is implied in each of the cases that follow.

Figure 7A:
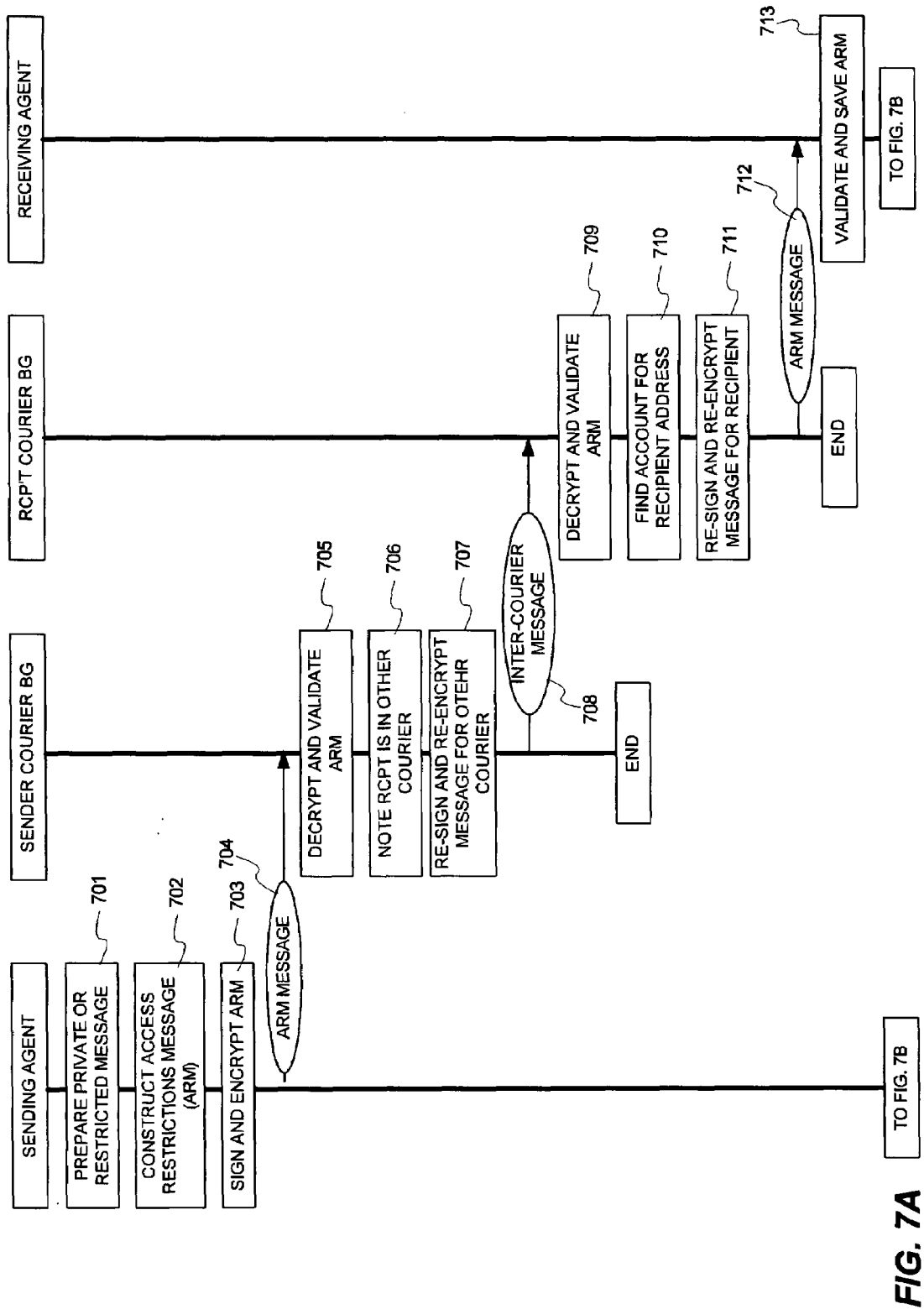
FIG. 7 illustrates a combination signaling sequence chart and flow chart for a Message Transfer involving two Trusted Couriers, which have been previously introduced to one another, in accordance with the present invention.
Figure 7B:
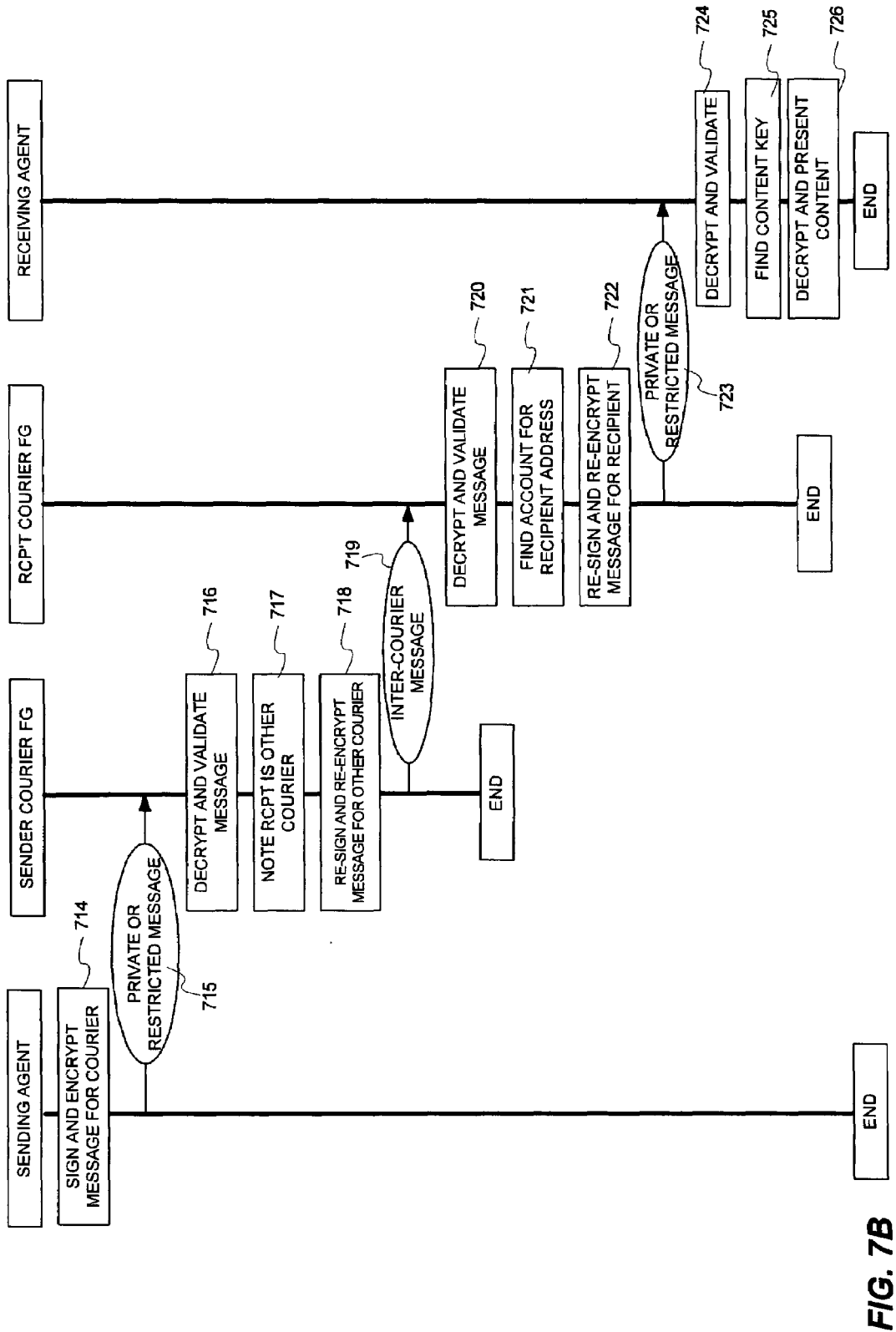

FIG. 7 depicts the scenario in which the sender and the recipient are Registered in different Couriers 103, and those Couriers 103 both have been Introduced to one another. Note that Introduction scenarios are depicted in FIGS. 8 and 9, and will be described later. For now, the inter-Courier routing of messages will be clearer if we start with them already Introduced.

The message flow begins as usual in step 701 with the preparation of a Private or Restricted message. Steps 701-705, in which the message is created and prepared, and the Access Restrictions Message is sent to Courier background element 130, are substantially identical to steps 601-605 in FIG. 6. In step 706, however, the process differs because Courier background element 130 detects that the recipient address is served in another Courier 103. This detection can take one of two forms. If the sender's Courier 103 is Private (refer back to FIG. 2), that the recipient's domain is different from the sender's domain will denote that a different Courier 103 serves the recipient. If the sender's Courier 103 is Public, it can know a different Courier 103 serves this specific recipient address if a previous Introduction has taken place as described in FIG. 9 for this recipient. Any Courier 103, Public or Private, may also make this detection if the recipient's domain matches that of a Private Courier 103 that is subordinate to the current one according to the certification hierarchy described in FIG. 2.

Once the sender's Courier background element 130 has determined the recipient's Courier background element 130, it will at step 707 imbed the Access Restrictions Message in an Inter-Courier message addressed to the recipient's Courier background element 130, and rewrap it in an S/MIME package (signed and encrypted) suitable for the destination Courier. The encryption key is found in the certificate provided by the recipient's Courier background element 130 during the aforementioned Introduction, while the signature key is that of the sender's Courier background element 130. Note that, unlike the certificates for Agent 110 communication, which are allocated per Registered address for both Courier and Agent, each Courier 103 Introduces itself to all other Couriers 103 using the same certificate.

In step 708 the Access Restrictions Message, imbedded in the Inter-Courier message, is transported from the sender's Courier background element 130 to the recipient's Courier background element 103. Upon arrival, at step 709 this message is unwrapped, decrypted, and validated as usual. Steps 710-713, wherein the background message is rewrapped and transported to the recipient Agent 110, and there saved for future use, are substantially identical to steps 606-609 in FIG. 6.

Similarly, the foreground processing continues substantially identically to the single-Courier case, with steps 714-716 moving the Private or Restricted message into the sender's Courier foreground element 120. At step 717, the same routing decision that is made at step 706 in the sender's Courier background element 130 is made in the sender's Courier foreground element 130. This brings to the fore the point that Introductions are propagated in parallel to both elements of a Trusted Courier 103 so that they can both make the same routing decisions using the same criteria. This is an important attribute of the present invention, because it allows each Courier foreground element 120 and corresponding Courier background element 130 to operate in parallel with a minimum of synchronization points. All of these synchronization points have already been described in FIGS. 3, 4, and 5 with respect to Registration and the procedures that affect a User's account. No synchronization between Courier foreground element 120 and Courier background element 130 is required during message flow or Introduction, thus eliminating any opportunity to compromise Private and Restricted messages.

Because of the aforementioned parallelism, transport of the foreground message from the sender's Courier foreground element 120 to the recipient's Courier foreground element 120 is substantially identical to transport of the background message between the two Courier background elements 130. Steps 717-720 are thus the same in the two Courier foreground elements 120 as steps 706-709 in the two Courier background elements 130. As well, once the foreground message has arrived at the recipient's Courier foreground element 120, processing steps 721-726 to move it into Agent 110 and there present it to the User are substantially identical to steps 615-620 in FIG. 6.

The simplicity of this description demonstrates the ease with which the present invention handles the steady state message flow in the traffic mesh network of FIG. 2. However, to establish this network requires Introduction procedures. FIG. 8 depicts the scenario in which the sender's Trusted Courier 103 is a Private Courier, not permitted to serve Users outside its domain, that has not been Introduced to the recipient's Trusted Courier 103.

In FIG. 8. it should be noted that the foreground and background processing occur independently of one another and have essentially the same shape. This lack of interdependence is an important feature of the present invention. The parallelism will be exploited in the following description as well, by providing a single description for both foreground and background paths and noting that both are alike.

As usual then, steps 801-803 prepare the message and transport the background component (the Access Restrictions Message) to the sender's Courier background element 130, while steps 815-816 transport the foreground component to the sender's Courier foreground element 120. This sequence is substantially identical to steps 701-705 and 714-716 in FIG. 7, although they are depicted in an even further condensed form.

At steps 804 in Courier background element 130 and 817 in Courier foreground element 120, the critical decision is made that the recipient's address cannot be served in this Trusted Courier 103, and is not known to be served in any other Trusted Courier 103 that has been Introduced to this one. Since this is a Private Courier, the decision is quite simple: the domain of the recipient's address does not match the domain of the sender's Courier 103, nor does it match the domain of any other Courier 103 to which this one has been Introduced. Therefore, the message is Deferred to the superior Courier 103. Refer to the discussion of the certification hierarchy in the context of FIG. 2 for a definition of the superior for each Trusted Courier 103.

Deferral takes the form of wrapping the message at hand in an Inter-Courier message, performing the S/MIME signature and encryption using appropriate keys, and sending the package to the appropriate member of the superior Courier 103. Steps 805-806 and 818-819 depict this action. Note that in both foreground and background, the Inter-Courier package carries not only the corresponding message, but in this case it also carries the certificate of the sender's Courier 103 in order to begin the Introduction. As the package is propagated to the proper Courier 103 for the recipient, this certificate will go along and serve to Introduce each member of the recipient's Courier 103 to the corresponding member of the sender's Courier 103.

One or more Superior Couriers 103 act upon the message as it is Deferred. At steps 807 and 820, the decision is made that this message should be directed to the corresponding member of the recipient's Courier 103. In this scenario that decision is substantially identical to the one made in steps 706 and 717 of FIG. 7. However, it is also possible that the immediate superior also does not know the recipient Courier 103, and executes another Deferral to its superior. Deferral can continue until the first Public Courier 103 is reached, which may be the Root Courier as described in the context of FIG. 2. FIG. 9 details what happens at that point. Once a superior Courier 103 is reached at which the actual recipient's Courier 103 has been Introduced previously, the message is processed and relayed accordingly. Thus, steps 808-811 and 821-826 are substantially identical to steps 707-713 and 718-726 of FIG. 7.

The members of the recipient's Courier 103 have not yet completed their processing, however. Noting at steps 812 and 827 that an Introduction was carried by the message, the certificate and address from that Introduction are captured in a new database entry for future reference. Subsequent messages addressed to recipients in the domain of the sender's Courier 103 in this scenario will be routed directly to that Courier 103 now that it has Introduced itself. The Introduction is then completed back to the first Courier 103 in order to close the loop. To do so the recipient's Courier background element 130 and Courier foreground element 120 each create an Introduction message and send it to the sender's Courier background element 130 and Courier foreground element 120 respectively in steps 813 and 828. These Introduction messages contain the certificate and address of the recipient's Courier 103. Upon arrival in the sender's Courier 103, these Introduction messages are consumed, and a new database entry is made for the recipient's Courier 103, its address and certificate. Note that no coordination is required between the foreground and background planes, because they are each handled independently of one another, providing the same information without synchronization points in the protocol.

In FIG. 8 Introduction is driven by Deferral of a message from a Private Courier 103 to its superior Courier 103. This works well within and among Private Couriers 103, but as soon as the message reaches a Public Courier 103, whether by Deferral or directly from an Agent 110 served there, and a recipient address is unknown at that Public Courier 103, Invitation will take place as previously described. However, because multiple Public Couriers 103 may exist in the network, and because not all Private Couriers 103 are known to all Public Couriers 103, it is quite possible for the Invitation to arrive at an existing Agent 110 that is Registered in a Courier 103 other than the Invitation's source. This is potentially a very confusing situation for the User, so appropriate automatic handling of the unwanted Invitation is required at Agent 110. FIG. 9 depicts this scenario, and the following paragraphs describe the necessary processing.

Beginning at step 901, and continuing through step 908, FIG. 9 depicts what appears to be an ordinary message flow involving a single Trusted Courier 103 and a recipient whose address is unknown there. The processing in this sequence is substantially identical to steps 601-605, 610-614, and 621-623 in FIG. 6, depicted here in a highly condensed fashion. Note, however, a small difference between the Introduction message in step 908 and that of the foundation disclosure: the sender's Courier foreground element 120 includes its Introduction certificate in the message, and signs the entire Invitation. This change is actually a benefit even without the multi-Courier network, because it allows invited recipients an opportunity to validate the authenticity of the message. Nevertheless, while it would have been useful before it is critical here in order to trigger Introductions between the members of the sender's and recipient's Couriers 103.

The key action in triggering these Introductions takes place in step 909. The Agent 110 which receives the Invitation from the sender's Courier foreground element 103 knows itself to be Registered already in a different Courier 103. Therefore, it rejects the unwanted Invitation by forwarding it to both members of its Courier 103. No User action is required unless Agent 110 is implemented in a loosely-coupled fashion as described in the foundation disclosure; even in that case the only action required is to open the message, whereupon the Agent 110 software is called and the process continues.

The background rejection occurs first, with Agent 110 forwarding the Invitation and its Introduction certificate to its (the recipient's) Courier background element 130 in an Invitation Reject message at step 910. Though not explicit in the diagram, this message is wrapped in the usual S/MIME package (signed and encrypted) for proper transport protection and authentication. Upon receiving, decrypting, and validating this message, the recipient's Courier background element 130 at step 911 extracts the Introduction certificate and creates a database entry for the sender's Courier background element 130 to which it points. Next, in step 912 an Introduction message is sent from the recipient's Courier background element 130 to the sender's Courier background element 130, encrypted using the latter's certificate and carrying with it the former's certificate. In addition, this Introduction message carries the original forwarded Invitation for correlation purposes. Upon receiving, decrypting, and validating this message, the sender's Courier background element 130 will at step 913 conclude the Introduction by creating a database entry for the recipient's Courier background element 130 and storing the received certificate there.

After the Introduction is complete between the two Courier Backgrounds 130, the pending Access Restrictions Message is handled. Remember that the sender's Courier background element 130 is holding that message, and awaiting notice from the corresponding Courier foreground element 120 that the addressed recipient has Registered. In order for the sender's Courier background element 130 to know that the recently completed Introduction is relevant to the pending message, the forwarded Invitation carried by the Introduction message in step 912 is consulted. The original recipient's address is available there, so the sender's Courier background element 130 can correlate the Introduction to the held message. Therefore, at step 914, it stops waiting for a Registration that will not occur, and instead records in the database entry for the recipient address that subsequent messages should be relayed to the just-introduced Courier background element 130. The pending Access Restrictions Message is released, to be relayed in the usual S/MIME package to the recipient's Courier background element 130 via the InterCourier Message in step 915. The processing and signaling in steps 916-918, which move the Access Restrictions Message the rest of the way to its destination, are substantially identical to steps 709-713 of FIG. 7.

With the background rejection complete, the foreground rejection can now be described. The steps taken are substantially identical to those of the previous paragraph, except that the messages flow through and the actions are taken by the respective Courier Foregrounds 120. The Invitation Reject message in step 919 is substantially identical to the one in step 910, and the remainder of the Introduction in steps 920-922 is the same as steps 911-913. Similarly, canceling the Registration and releasing the held message in step 923 is the same as canceling the Registration and releasing the held message in step 914. Finally, now that the recipient's address is correlated with the correct Courier foreground element 120, the inter-Courier message propagation and final delivery shown in steps 924-929 are substantially identical to the same processing and signaling in steps 717-726 in FIG. 7.

Note how the background and foreground rejections propagate independently of one another, as well as how the Introductions and message releases they trigger also flow without interaction between the various background and foreground elements of the Trusted Couriers 103 that are involved. This is yet another example of the robust interlock-free protocol design intended in the present invention. While the Foreground Invitation Reject in step 919 is shown being sent after arrival and processing of the Access Restrictions Message in step 918, this is a descriptive convenience rather than a protocol requirement. In fact, in the preferred embodiment the Foreground Invitation Reject in step 919 is sent immediately after the Background Invitation Reject in step 910, thereby allowing Agent 110 to quiesce while the rest of the system does its work. Then the messages that arrive as a result will be handled asynchronously, just as they normally are in other scenarios.

The invention has been described above with reference to preferred embodiments. It is not intended that the invention be limited to the specific embodiments shown and described, but that the invention be limited in scope only by the claims appended hereto. It will be evident to those skilled in the art that various substitutions, modifications, and extensions may be made to the embodiments as well as to various technologies which are utilized in the embodiments. In particular, those skilled in the art will recognize that the scenarios posed above are elementary in nature, and a working system will support numerous and various combinations of those scenarios in order to provide the described services. That the infinitude of possible topologies, combinations, and scenario orderings are not explicitly enumerated here should not imply that they have not been adequately disclosed by the descriptions of fundamental elements given here. It will also be appreciated by those skilled in the art that such substitutions, modifications, and extensions fall within the spirit and scope of the invention, and it is intended that the invention as set forth in the claims appended hereto includes all such substitutions, modifications, and extensions.

The invention claimed is:

1. A method for routing a private message between a sending agent and a recipient agent, the method comprising
providing a first agent;
and a first courier having knowledge of a number of agents, including the first agent, that are registered with the first courier;
providing a second agent and a second courier having knowledge of a number of agents, including the second agent, that are registered with the second courier;
subsequently providing a private message from the first agent to the first courier, the private message comprising a header and a message ID, wherein the private message header identifies a recipient address of the second agent, and wherein the content is encrypted using a content encryption key (CEK);
next signing and encrypting the private message with a first message signing key used by the first agent for messages to the first courier;
then sending the signed private message in one or more parts addressed to the first courier, the message comprising the header, message ID, the encrypted content of the private message, and the CEK used to encrypt the content of the private message;
upon arrival of the aforementioned signed private message in the first courier, decrypting and validating the private message header using the first message signing key known to the first courier, wherein the private message content remains encrypted by the CEK;
next identifying the second courier from the recipient address in the decrypted first message header;
then for each of the at least one registered recipient addresses in the decrypted message header, reconstructing the message and relaying it by:
first signing and encrypting the reconstructed message using a second message signing key used by the first courier for messages to the second courier;
then sending the signed and encrypted reconstructed message in one or more parts to the second courier, the signed and encrypted reconstructed message comprising the header, message ID, the encrypted content of the private message, and the CEK used to encrypt the content of the private message;
upon arrival of the aforementioned signed and encrypted reconstructed message in the second courier, decrypting and validating the private message header using the second message signing key known to the second courier, wherein the private message content remain encrypted by the CEK;
next identifying the recipient address in the decrypted message header;
then signing and encrypting the private message with a third message signing key used by the second agent for messages to the second agent; and
sending the signed private message in one or more parts to the second agent, the message comprising the header, message ID, the encrypted content of the private message, and the CEK used to encrypt the content of the private message;
upon arrival of the signed private message in the second agent, decrypting it using the third message signing key; and
decrypting the encrypted content in the second agent using the CEK.

2. The method of claim 1 wherein the first courier comprises a foreground component and a background component and the second courier comprises a foreground component and a background component;
the act of sending the signed private message to the first courier comprises:
sending a foreground message part from the first agent to the foreground component of the first courier, wherein the foreground message part comprises a message body that contains the header, message ID, and CEK-encrypted content of the private message;
sending a background message part from the first agent to the background component of the first courier separately from the foreground message part, wherein the background message part comprises a message body that contains the header, message ID, and the CEK used to encrypt the content of the private message;
and the act of sending the signed and encrypted reconstructed message comprises:
sending a foreground message part from the first courier foreground component to the foreground component of the second courier, wherein the foreground message part comprises a message body that contains the header, message ID, and CEK-encrypted cement of the private message;
sending a background message part from the first courier background element to the background component of the first courier, wherein the background message part comprises a message body dint comprises the header, message ID, and the CEK used to encrypt the content of the private message;
wherein the acts of sending the foreground and background message parts are performed in parallel, in such a manner that they ale kept separate from one another and conveyed independently.

* * * * *